United States Patent
Yuda et al.

(10) Patent No.: US 8,498,327 B2
(45) Date of Patent: Jul. 30, 2013

(54) WIRELESS COMMUNICATION APPARATUS

(75) Inventors: Yasuaki Yuda, Kanagawa (JP); Takaaki Kishigami, Tokyo (JP); Takashi Fukagawa, Kanagawa (JP); Yoichi Nakagawa, Tokyo (JP); Shinichiro Takabayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/459,884

(22) Filed: Apr. 30, 2012

(65) Prior Publication Data

US 2012/0213131 A1   Aug. 23, 2012

Related U.S. Application Data

(63) Continuation of application No. 12/687,453, filed on Jan. 14, 2010, now Pat. No. 8,189,649, which is a continuation of application No. 10/598,441, filed as application No. PCT/JP2005/014101 on Aug. 2, 2005, now Pat. No. 7,676,005.

(30) Foreign Application Priority Data

Aug. 9, 2004   (JP) ................................. 2004-231930
Jul. 26, 2005   (JP) ................................. 2005-215321

(51) Int. Cl.
*H04B 1/38*   (2006.01)
(52) U.S. Cl.
USPC ........... 375/219; 375/220; 375/222; 375/223; 375/295; 375/316; 455/73; 455/403
(58) Field of Classification Search
USPC .................. 375/130, 135, 150, 219, 220, 250, 375/259, 260, 262, 267, 295, 316, 322, 342, 375/345, 346, 350, 354
See application file for complete search history.

(56) References Cited

U.S. PATENT DOCUMENTS

| | | | |
|---|---|---|---|
| 6,363,104 B1 | 3/2002 | Bottomley | |
| 6,404,760 B1 | 6/2002 | Holtzman | |
| 6,680,967 B1 | 1/2004 | Westman | |
| 7,016,397 B1 | 3/2006 | Vihriala | |
| 7,333,420 B2 | 2/2008 | Higuchi et al. | |
| 7,366,520 B2 * | 4/2008 | Haustein et al. | ............. 455/450 |
| 7,747,250 B2 | 6/2010 | Larsson et al. | |

(Continued)

FOREIGN PATENT DOCUMENTS

| | | |
|---|---|---|
| JP | 11-274836 A | 10/1999 |
| JP | 2001-237751 A | 8/2001 |

(Continued)

*Primary Examiner* — Hirdepal Singh
(74) *Attorney, Agent, or Firm* — Pearne & Gordon LLP

(57) ABSTRACT

Wireless communication apparatus adopting a time division duplex system for transmission and reception using plural antennas, deviation of amplitude and phase occurring between transmission and reception circuits is detected and corrected using a communication signal. Channel estimation means detects channel information based on reception output of N reception circuits having a one-to-one correspondence with N antennas. Correction value detection means finds a correction value for correcting deviation occurring between each of N transmission circuits and each of the N reception circuits based on the channel information. A wireless communication apparatus transmits an already known signal (training signal) to a base station with which the wireless communication apparatus conducts communications. The base station executes channel estimation based on the already known signal and generates and transmits a correction signal (probe signal). The correction value detection means of the wireless communication apparatus detects the correction value using the correction signal.

6 Claims, 8 Drawing Sheets

U.S. PATENT DOCUMENTS

| | | | |
|---|---|---|---|
| 7,961,774 B2* | 6/2011 | Onggosanusi et al. | 375/144 |
| 8,000,421 B2 | 8/2011 | Takano et al. | |
| 8,019,013 B2* | 9/2011 | Yamada et al. | 375/267 |
| 8,068,874 B2* | 11/2011 | Kuwahara et al. | 455/561 |
| 8,218,609 B2* | 7/2012 | Walton et al. | 375/219 |
| 8,219,039 B2* | 7/2012 | Yamazaki et al. | 455/69 |
| 2002/0159430 A1 | 10/2002 | Atarashi et al. | |
| 2003/0211851 A1 | 11/2003 | Moon | |
| 2004/0120411 A1* | 6/2004 | Walton et al. | 375/260 |
| 2004/0121827 A1 | 6/2004 | Murakami et al. | |
| 2004/0176136 A1* | 9/2004 | Doi et al. | 455/562.1 |
| 2004/0192218 A1* | 9/2004 | Oprea | 455/73 |
| 2005/0008086 A1 | 1/2005 | Koga | |
| 2005/0185728 A1 | 8/2005 | Wallace | |
| 2005/0249303 A1* | 11/2005 | Takano | 375/267 |
| 2006/0094468 A1* | 5/2006 | Hoshino et al. | 455/561 |
| 2007/0253476 A1* | 11/2007 | Tirkkonen et al. | 375/230 |
| 2007/0275674 A1 | 11/2007 | Chien | |
| 2008/0037681 A1 | 2/2008 | Walton | |
| 2008/0069015 A1 | 3/2008 | Walton | |
| 2008/0107048 A1 | 5/2008 | Jalali | |
| 2010/0183088 A1 | 7/2010 | Inanoglu | |

FOREIGN PATENT DOCUMENTS

| | | |
|---|---|---|
| JP | 2003-092548 A | 3/2003 |
| JP | 2005-160030 A | 6/2005 |
| WO | 00-60757 A1 | 10/2000 |
| WO | 2004039022 A2 | 5/2004 |
| WO | 2005064871 A1 | 7/2005 |

* cited by examiner

TIME-DIVISION-MULTIPLEXED PILOT SIGNAL

CODE-DIVISION-MULTIPLEXED PILOT SIGNAL

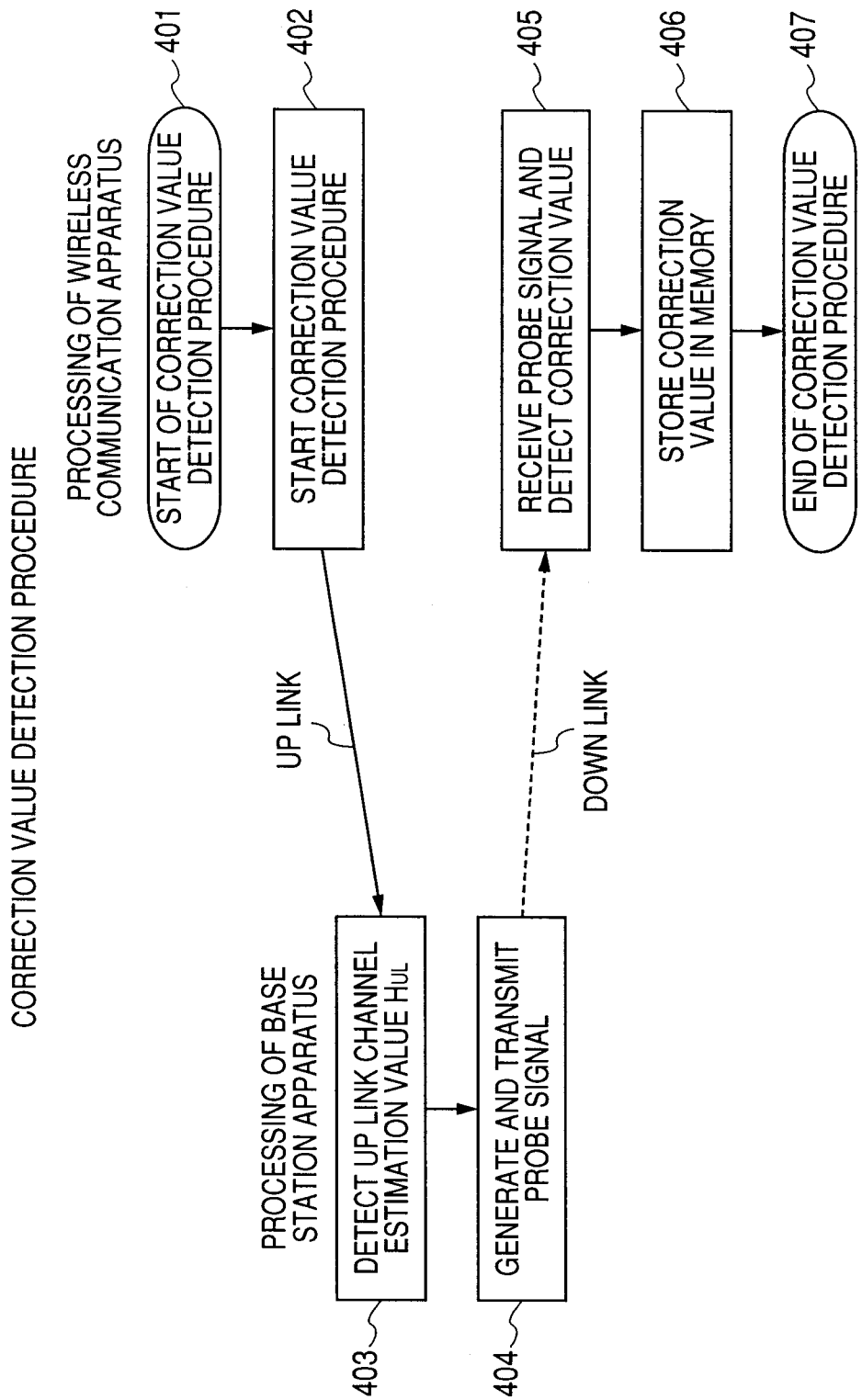

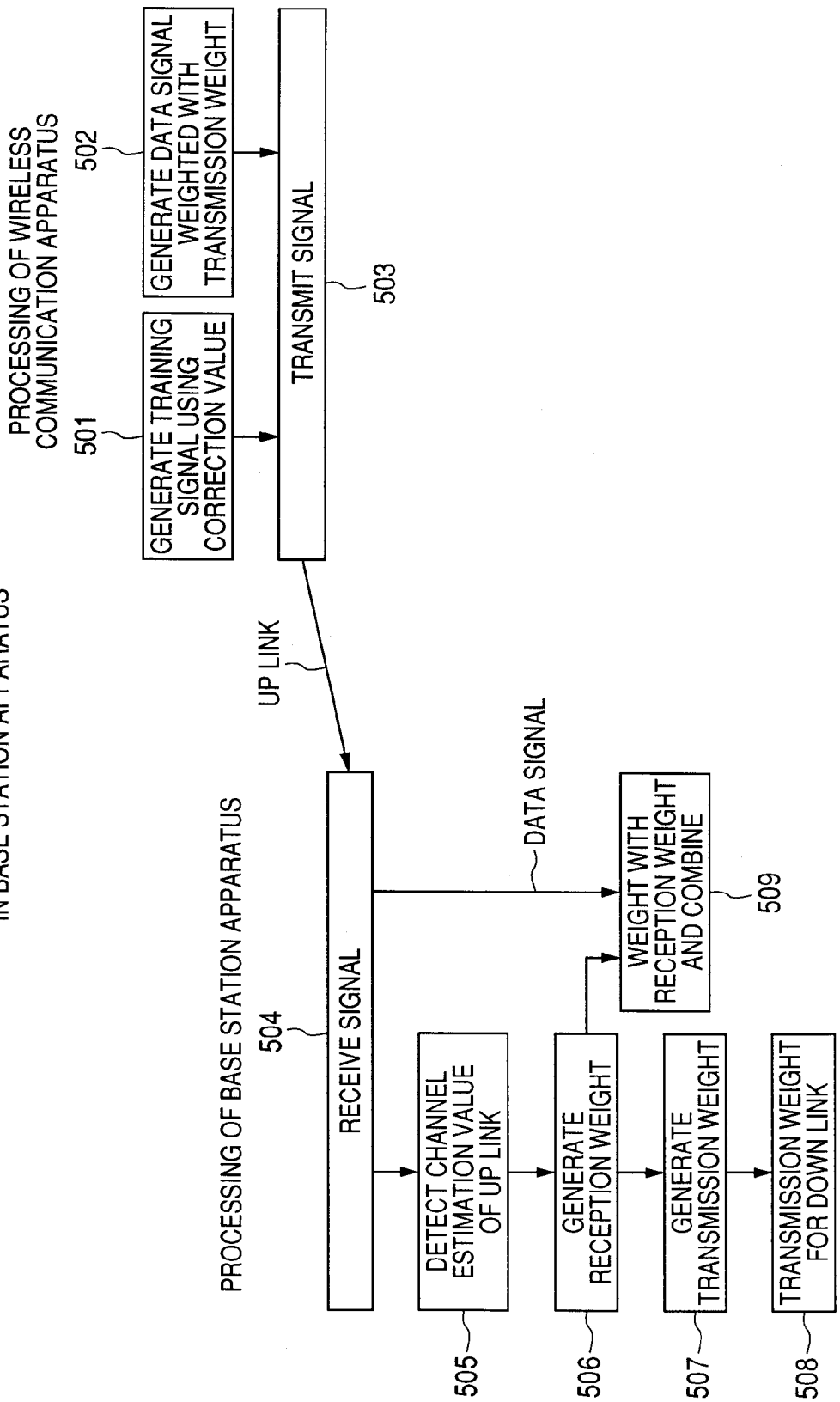

RECEPTION CHARACTERISTIC FOR Eb/N0

WIRELESS COMMUNICATION APPARATUS

This application is a continuation of U.S. patent application Ser. No. 12/687,453 filed Jan. 14, 2010, which is incorporated herein by reference in its entirety.

TECHNICAL FIELD

This invention relates to a wireless communication apparatus for conducting wireless communications using a plurality of antennas.

BACKGROUND ART

Demand for high-speed, large-capacity data transmission has also grown in wireless communications with rapid development of multimedia communications in recent years. Accordingly, a communication method for executing high-speed, large-capacity data transmission using frequencies efficiently in a limited frequency band is required. Then, attention is focused on a communication method for conducting communications using a plurality of antennas at both the transmission and reception parties. As a plurality of antennas are used for both the transmission and reception, if different signals are transmitted at the same frequency at the same time, appropriate processing is performed for the signals at the reception side or both the transmission and reception parties, the transmitted signals can be separated for reception. Accordingly, the transmission capacity can be increased without enlarging the frequency band and high-speed, large-capacity data transmission can be accomplished.

Proposed as the communication method as described above is an art wherein signals of a plurality of antennas are weighted according to a coefficient called weight at the transmission and reception parties, whereby if a plurality of signals are transmitted at the same time, the signals can be separated for reception (for example, refer to patent document 1). As a method of determining the weight in transmission and reception, a channel estimation value representing the communication channel situation is detected at the reception side and a characteristic vector is calculated from the channel estimation value and is used as weight. Since the channel estimation value is unknown at the transmission side, the channel estimation value detected at the reception side or the weight calculated at the reception side is fed back using a reverse communication link, whereby the weight at the transmission side is determined. In a time division duplex (TDD) system, the transmission side can use the reception channel estimation value on the reverse communication link. Since the same frequency is shared between the forward and reverse links, the communication channel situation can be assumed to be identical.

To thus share the channel estimation value between the forward and reverse links, preferably the transmission and reception circuits of the wireless communication apparatus are equal in amplitude and phase; in the actual apparatus, however, deviation occurs in the amplitude and the phase between the transmission and reception circuits because of the individual difference among radio frequency circuits of a power amplifier, etc., and transfer links, deviation of the circuit characteristic caused by temperature change of the environment, etc.

The channel estimation values detected at the forward and reverse reception parties when amplitude, phase deviation exists between the transmission and reception circuits of a wireless communication apparatus as described above are shown in Expressions (1) and (2) shown below. Here, let the forward channel estimation value be $H_{FL}$, the reverse channel estimation value be $H_{RL}$, and a channel response matrix that a wireless communication signal receives in propagation from a forward transmission antenna to reception antenna be H. Let amplitude, phase deviation of a transmission circuit and amplitude, phase deviation of a reception circuit in the forward direction be $Z_{FL\_TX}$ and $Z_{FL\_RX}$ respectively and amplitude, phase deviation of a transmission circuit and amplitude, phase deviation of a reception circuit in the reverse direction be $Z_{RL\_TX}$ and $Z_{RL\_RX}$ respectively. Let the number of forward transmission antennas be M and the number of reception antennas be N. T denotes transposition of matrix. Accordingly, $H_{FL}$ and $H_{RL}$ become as follows:

[Expression 1]

$$H_{FL} = Z_{FL\_Rx} \cdot H \cdot Z_{FL\_Tx} \quad (1)$$

$$= \begin{bmatrix} z_{FL\_Rx1} & & 0 \\ & \ddots & \\ 0 & & z_{FL\_RxN} \end{bmatrix} \begin{bmatrix} h_{1,1} & h_{1,2} & \cdots & h_{1,M} \\ \vdots & & h_{i,j} & \vdots \\ h_{N,1} & h_{N,2} & \cdots & h_{N,M} \end{bmatrix}$$

$$\begin{bmatrix} z_{FL\_Tx1} & & 0 \\ & z_{FL\_Tx2} & \\ & & \ddots & \\ 0 & & & z_{FL\_TxM} \end{bmatrix}$$

[Expression 2]

$$H_{RL} = Z_{RL\_Rx} \cdot H \cdot Z_{RL\_Tx} \quad (2)$$

$$= \begin{bmatrix} z_{RL\_Rx1} & & & 0 \\ & z_{RL\_Rx2} & & \\ & & \ddots & \\ 0 & & & z_{RL\_RxM} \end{bmatrix} \begin{bmatrix} h_{1,1} & \cdots & h_{N,1} \\ h_{1,2} & & h_{N,2} \\ \vdots & h_{i,j} & \vdots \\ h_{1,M} & \cdots & h_{N,M} \end{bmatrix}$$

$$\begin{bmatrix} z_{RL\_Tx1} & & 0 \\ & \ddots & \\ 0 & & z_{RL\_TxN} \end{bmatrix}$$

Thus, if amplitude, phase deviation occurs in the transmission and reception circuits of the wireless communication apparatus, the forward and reverse channel estimation values differ. Thus, if the forward channel estimation value detected at the forward reception side is used to generate reception weight, no problem arises; however, if the forward channel estimation value is used to generate reverse transmission weight, effect occurs from amplitude, phase deviation between the transmission and reception circuits and the characteristic is degraded.

FIG. 8 shows an example of finding the reception characteristic (error rate) by computer simulation when amplitude, phase deviation occurs between the transmission and reception circuits of a wireless communication apparatus. The simulation conditions are as follows: Modulation system is QPSK; the number of transmission antennas is two; the number of reception antennas is two; the characteristic vectors of channel estimation values are used for transmission and reception weights; reception weight is generated using a forward channel estimation value; and transmission weight is generated using a reverse channel estimation value. Amplitude deviation 5% and phase deviation (excursion) ±30, 60, and 90 degrees are generated as deviation between the transmission and reception circuits of the wireless communication apparatus. From FIG. 8, it can be acknowledged that the reception characteristic is degraded as the phase deviation (excursion) grows.

On the other hand, an art of detecting and correcting deviation of amplitude and phase occurring between transmission and reception circuits in a wireless communication apparatus is proposed (for example, refer to patent document 2). The wireless apparatus is configured to detect deviation occurring between the transmission and reception circuits using a communication signal used for transmission generated by the wireless communication apparatus and a reference signal not used as the communication signal, and has an antenna and the transmission circuit and the reception circuit sharing the antenna. At the calibration time, output of the transmission circuit is connected to input of the reception circuit and the phase rotation amount and/or the amplitude deviation amount of a signal passing through the transmission and reception circuits is calculated. Next, the reference signal is connected to the input of the reception circuit and the phase rotation amount and/or the amplitude deviation amount of signal passing through the reception circuit is calculated. The information pieces are subtracted, whereby the phase rotation amount and/or the amplitude deviation amount of the signal passing through the transmission circuit is calculated. Based on the information, a correction value for correcting the phase rotation amount and/or the amplitude deviation amount difference between the transmission and reception circuits is calculated. Using the correction value, the phase rotation amount and/or the amplitude deviation amount difference between the transmission and reception circuits is corrected.

Patent document 1: JP-A-2001-237751
Patent document 2: International Patent Publication No. 00/60757

DISCLOSURE OF THE INVENTION

Problems to be Solved by the Invention

However, as in the related art example described above, the wireless communication apparatus that can detect and correct (calibrate) deviation of amplitude and phase occurring between transmission and reception circuits requires addition of calibration hardware in the wireless communication apparatus. That is, the deviation detection signal (reference signal) is generated aside from the communication signal and a switch circuit for connecting the output of the transmission circuit or the reference signal to the input of the reception circuit becomes necessary at the calibration time. Thus, the complexity of the wireless communication apparatus increases and the apparatus becomes upsized. Therefore, the configuration can be implemented as a large wireless communication apparatus like a base station apparatus, but it is difficult to implement the configuration as a small wireless communication apparatus like a mobile terminal.

It is therefore an object of the invention to provide a wireless communication apparatus capable of correcting the transfer line characteristics of transmission circuits and reception circuits according to a simple configuration without generating a deviation detection signal in the wireless communication apparatus and without the need for adding a switch circuit for switching connection of input of the reception circuits.

Means for Solving The Problems

According to the invention, first, there is provided a wireless communication apparatus for conducting wireless communications according to a time division duplex (TDD) system, the wireless communication apparatus including a plurality of antennas, a transmission circuit for transferring a transmission signal to the plurality of antennas, a reception circuit for transferring a reception signal from the plurality of antennas, channel estimation means for detecting channel information using the reception signal from the reception circuit, and correction value detection means for detecting a correction value for correcting deviation occurring between the transmission circuit and the reception circuit using the channel information from the channel estimation means, wherein the correction value detection means detects the correction value using a correction signal transmitted from a wireless communication apparatus with which the wireless communication apparatus conducts communications.

Accordingly, deviation occurring in the transmission and reception circuits in the wireless communication apparatus can be corrected according to the simple configuration without adding a circuit for generating a correction signal (reference signal, etc.,) or a switch circuit aside from the communication signal.

Second, the wireless communication apparatus first described above includes reception weight generation means for generating reception weight using the channel information from the channel estimation means, reception signal weighting and combining means for weighting a plurality of reception signals from the reception circuit using the reception weight and combining the signals, transmission weight generation means for generating transmission weight using the reception weight and the correction value from the correction value detection means, and transmission signal weighting means for weighting transmission data using the transmission weight.

Accordingly, the transmission weight is corrected, whereby deviation can be corrected.

Third, the wireless communication apparatus first or second described above includes already known signal transmission means for transmitting an already known signal to the wireless communication apparatus communicating with the wireless communication apparatus, wherein the correction value detection means detects the correction value for correcting deviation occurring between the transmission and reception circuits connected to each antenna from the correction signal transmitted from the wireless communication apparatus with which the wireless communication apparatus conducts communications and received by the wireless communication apparatus.

Accordingly, using the communication signal with the wireless communication apparatus of the associated side, the deviation occurring between the transmission and reception circuits can be detected and corrected.

Fourth, according to the invention, there is provided a wireless communication apparatus for conducting wireless communications with the wireless communication apparatus as claimed in claim 3, the wireless communication apparatus including a plurality of antennas, a transmission circuit for transferring a transmission signal to the plurality of antennas, and a reception circuit for transferring a reception signal from the plurality of antennas, channel estimation means for estimating a channel estimation value based on a received already known signal, correction signal generation means for generating a correction signal based on the channel estimation value, and correction signal transmission means for transmitting the generated correction signal.

Accordingly, the wireless communication apparatus of the associated side estimates a channel estimation value based on the received already known signal and generates and transmits a correction signal based on the channel estimation value, whereby the deviation occurring between the transmission and reception circuits can be corrected using the correction signal.

Fifth, in the wireless communication apparatus fourth described above, the correction signal generation means generates the correction signal so that it becomes a reciprocal of the channel estimation value.

Sixth, in the wireless communication apparatus fourth described above, the correction signal generation means decomposes the channel estimation value into singular values and generates the correction signal using the result.

Thus, using the reciprocal of the channel estimation value or the result of decomposing the channel estimation value into singular values, the correction signal can be generated and correction can be made.

Seventh, the wireless communication apparatus third described above includes distribution means for distributing a part of the transmission signal from the transmission means, switch means for being connected so as to transfer the transmission signal distributed by the distribution means to the reception circuit, and amplitude deviation correction value detection means for detecting an amplitude deviation correction value for correcting amplitude deviation changing as the signal before transferred through the transmission circuit and the signal after transferred through the reception circuit are input and are transferred through the transmission circuit or the reception circuit.

Accordingly, the amplitude deviation correction value for correcting amplitude deviation is detected and the deviation occurring between the transmission and reception circuits can be corrected.

Eighth, in the wireless communication apparatus seventh described above, the switch means switches so as to transfer a part of the transmission signal distributed by the distribution means to the reception circuit at the transmission timing in the time division duplex system and so as not to transfer a part of the transmission signal distributed by the distribution means to the reception circuit at the reception timing in the time division duplex system.

Thus, the signal is switched in response to the transmission or reception timing, whereby the amplitude deviation correction value for correcting amplitude deviation can be detected.

Ninth, in the wireless communication apparatus fourth described above, the correction signal generation means generates the correction signal so as to correct phase rotation of the channel estimation value.

Thus, the correction signal is generated so as to correct phase rotation of the channel estimation value and the deviation occurring in the transmission and reception circuits can be corrected using the correction signal.

Advantages of the Invention

According to the invention, there can be provided a wireless communication apparatus capable of correcting the transfer line characteristics of transmission circuits and reception circuits according to a simple configuration even in a small wireless communication apparatus without generating a correction signal in the wireless communication apparatus.

BRIEF DESCRIPTION OF THE DRAWINGS

FIG. 4 A chart to show a correction value detection procedure in the first embodiment.

FIG. 5 A chart to show a transmission and reception weight generation procedure in the base station apparatus of the first embodiment.

Figure 1:
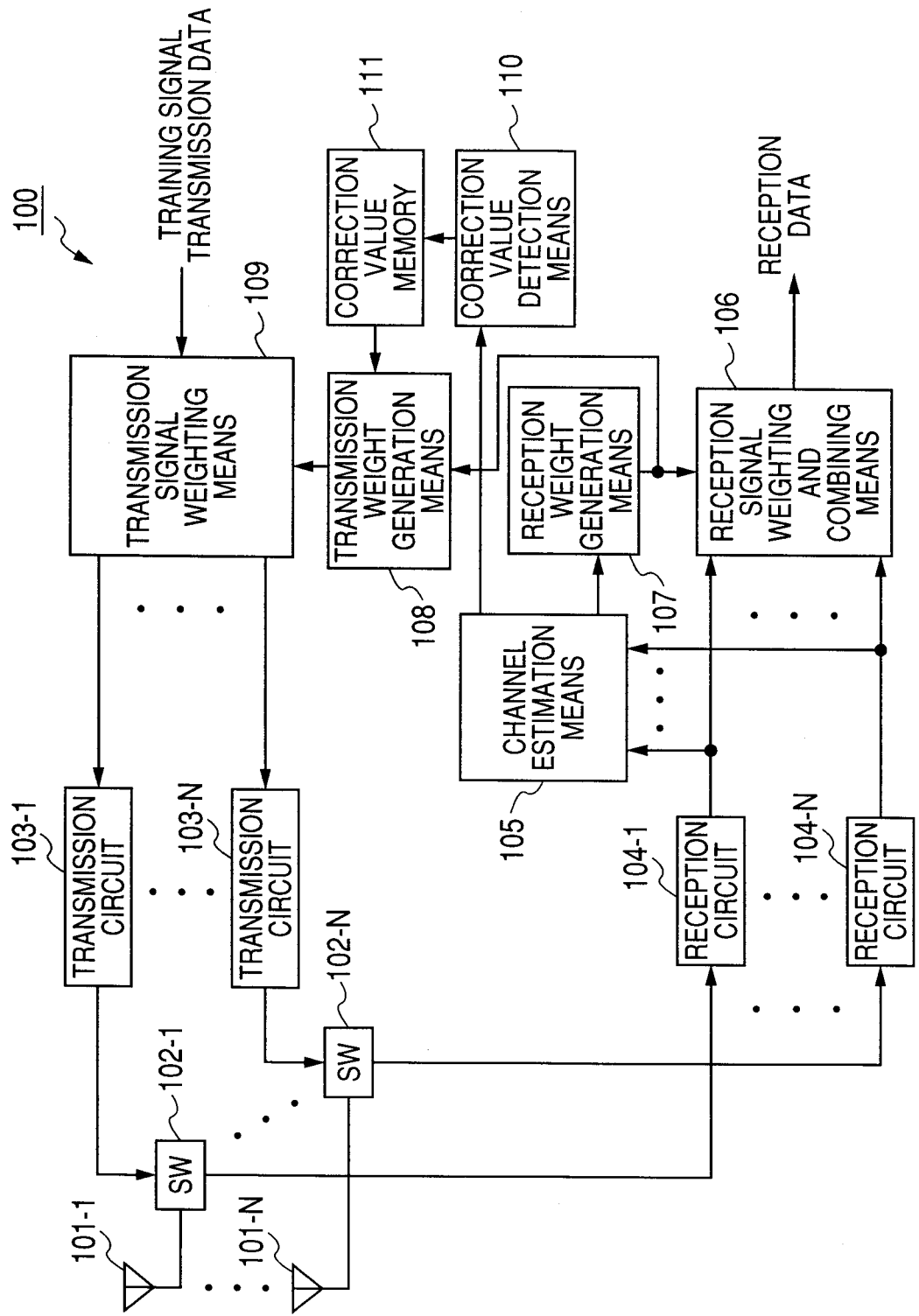
FIG. 1 A block diagram of a wireless communication apparatus according to a first embodiment of the invention.

DESCRIPTION OF REFERENCE NUMERALS 100, 700 Wireless communication apparatus
101, 201, 701 Antenna
102, 202, 702 Switch means
103, 203, 703 Transmission circuit
104, 204, 704 Reception circuit
105, 205, 705 Channel estimation means
106, 206, 706 Reception signal weighting and combining means
107, 207, 707 Reception weight generation means
108, 208, 708 Transmission weight generation means
109, 209, 709 Transmission signal weighting means
110, 710 Correction value detection means
111, 711 Correction value memory
200 Base station apparatus
212 Probe signal generation means
713 Distribution means
714 Amplitude correction value detection means

BEST MODE FOR CARRYING OUT THE INVENTION

First Embodiment

FIG. 1 is a block diagram of a wireless communication apparatus according to a first embodiment of the invention. A wireless communication apparatus 100 is made up of a plurality of (N) antennas 101-1 to 101-N, a plurality of (N) transmission-reception switch means (SW) 102-1 to 102-N, a plurality of (N) transmission circuits 103-1 to 103-N, a plurality of (N) reception circuits 104-1 to 104-N, channel estimation means 105, reception signal weighting and combining means 106, reception weight generation means 107, transmission weight generation means 108, transmission signal weighting means 109, correction value detection means 110, and correction value memory 111.

Here, considering that the wireless communication apparatus 100 shown in FIG. 1 is a mobile terminal, for example, a base station apparatus is a wireless communication apparatus of a side for communicating with the wireless communication apparatus 100.

Figure 2:
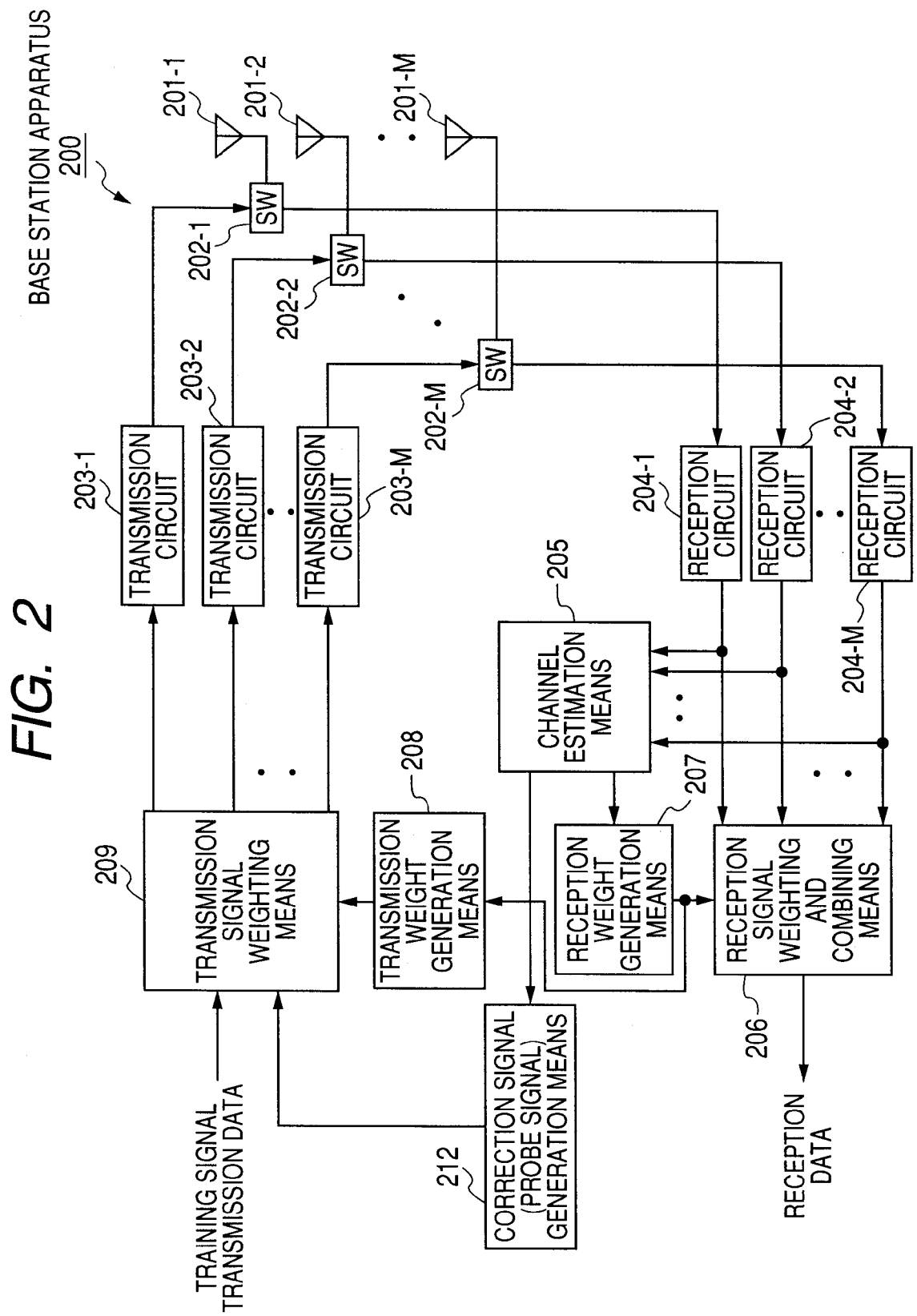
FIG. 2 A block diagram of a base station apparatus for communicating with the wireless communication apparatus according to the first embodiment of the invention.

FIG. 2 is a block diagram of a base station apparatus for communicating with the wireless communication apparatus shown in FIG. 1. A base station apparatus 200 is made up of a plurality of (M) antennas 201-1 to 201-M, a plurality of (M)

transmission-reception switch means (SW) 202-1 to 202-M, a plurality of (M) transmission circuits 203-1 to 203-M, a plurality of (M) reception circuits 204-1 to 204-M, channel estimation means 205, reception signal weighting and combining means 206, reception weight generation means 207, transmission weight generation means 208, transmission signal weighting means 209, and correction signal (probe signal) generation means 212.

The number of antennas (N) of the wireless communication apparatus 100 shown in FIG. 1 may be the same as or may be different from the number of antennas (M) of the base station apparatus 200 shown in FIG. 2.

A TDD system using the same frequency band and dividing up and down links according to the time is handled as a link connection system in wireless communications. Multiple access system is not limited. For example, time division multiple access (TDMA) for dividing connection channels according to the time, code division multiple access (CDMA) for executing division multiplex according to discrete code for each connection channel, etc., is available. Modulation system is not limited either. For example, a digital phase modulation (phase shift keying (PSK)) system, a digital quadrature amplitude modulation (QAM) system, etc., is available.

Next, the components of the wireless communication apparatus 100 shown in FIG. 1 will be discussed. The transmission signal weighting means 109 inputs transmission data and weights the transmission data according to the transmission weight for each antenna generated by the transmission weight generation means 108. The transmission weight is, for example, a complex coefficient made up of amplitude and phase information and the transmission data is multiplied by the transmission weight and is weighted. The weighted transmission signal for each antenna is input to each of the transmission circuits 103-1 to 103-N. Each of the transmission circuits 103-1 to 103-N performs processing of conversion of a digital signal to an analog signal, frequency conversion from baseband frequency to radio frequency, transmission power amplification, etc. Each of the transmission circuits 103-1 to 103-N contains processing with an analog device. In the processing with an analog device, deviation occurs in amplitude and phase because of the characteristic of the analog device. Next, an output signal of each of the transmission circuits 103-1 to 103-N is input to each of the transmission-reception switch means 102-1 to 102-N and the transmission signal is fed into each of the antennas 101-1 to 101-N at the transmission timing in the time division duplex system, whereby the signal is transmitted to the base station apparatus 200.

A signal from the base station apparatus 200 is received at each of the antennas 101-1 to 101-N. The reception signals received at the antennas 101-1 to 101-N are supplied to the transmission-reception switch means (SW) 102-1 to 102-N and are supplied to the reception circuits 104-1 to 104-N at the reception timings. Each of the reception circuits 104-1 to 104-N performs processing of power amplification of the reception signal, frequency conversion of radio frequency to baseband frequency or intermediate frequency, conversion of an analog signal to a digital signal, etc. Each of the reception circuits 104-1 to 104-N contains processing with an analog device. In the processing with an analog device, deviation occurs in amplitude and phase because of the characteristic of the analog device.

The reception signal weighting and combining means 106 weights the reception digital signal supplied from each of the reception circuits 104-1 to 104-N according to the reception weight for each antenna generated by the reception weight generation means 107. Like the transmission weight, the reception weight is, for example, a complex coefficient. The channel estimation means 105 inputs the reception digital signals from the reception circuits 104-1 to 104-N and executes channel estimation indicating the situation of the propagation path. The reception weight generation means 107 generates reception weight according to the channel estimation value detected by the channel estimation means 105. The correction value detection means 110 detects a correction value for correcting deviation occurring between the transmission and reception circuits of the wireless communication apparatus 100 using the detection result of the channel estimation means 105. The correction value detected by the correction value detection means 110 is stored in the correction value memory 111. The transmission weight generation means 108 corrects deviation occurring between the transmission and reception of the wireless communication apparatus 100 using the correction value stored in the correction value memory 111 for the reception weight generated by the reception weight generation means 107, thereby generating transmission weight.

Next, the components of the base station apparatus 200 shown in FIG. 2 will be discussed. Components identical with those of the wireless communication apparatus 100 shown in FIG. 1 operate in the same manner as the components of the wireless communication apparatus 100 described above. However, as for amplitude, phase deviation in each of the transmission circuits 203-1 to 203-M and each of the reception circuits 204-1 to 204-M, amplitude, phase deviation occurring between the transmission and reception circuits can be corrected according to the method described in patent document 2 described in Background Art or the like because the apparatus is the base station apparatus. The correction signal (probe signal) generation means 212 generates a probe signal as a correction signal using the channel estimation value of the up link detected by the channel estimation means 205.

The channel estimation means 105 of the wireless communication apparatus 100 in FIG. 1 detects the channel estimation value as the situation of the propagation path of the down link, and the channel estimation means 205 of the base station apparatus 200 in FIG. 2 detects the channel estimation value as the situation of the propagation path of the up link. Here, a detection method of the channel estimation value on the down link will be discussed as an example of the detection method of the channel estimation value.

The base station apparatus 200 transmits a signal whose signal series is already known in the wireless communication apparatus 100 from each of the antennas 201-1 to 201-M. Here, the already known signal is called training signal. Since all channels responses between each of the transmission antennas 201-1 to 201-M and each of the reception antennas 101-1 to 101-N are required, a method of transmitting the training signal separately for each antenna is used as the training signal transmission method.

Figure 3A:
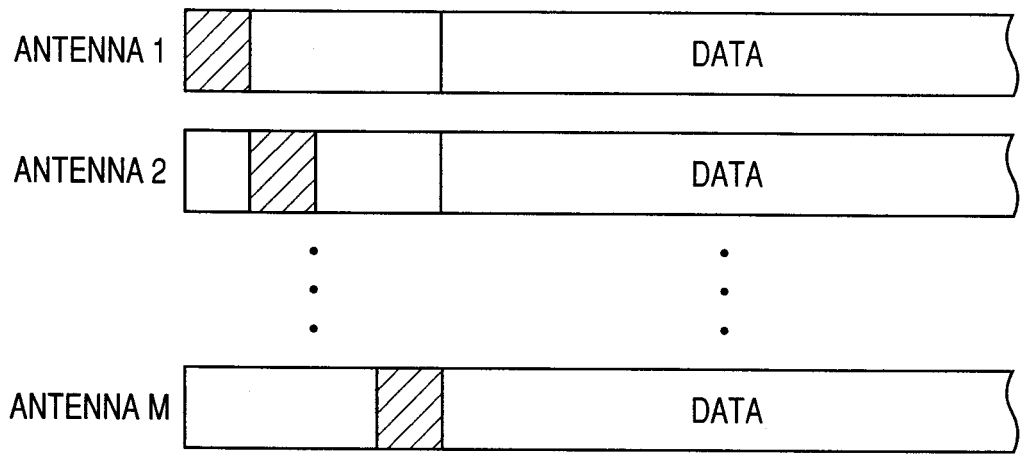
FIG. 3 A drawing to show specific examples of a method of transmitting a training signal separately for each antenna in the first embodiment.
Figure 3B:
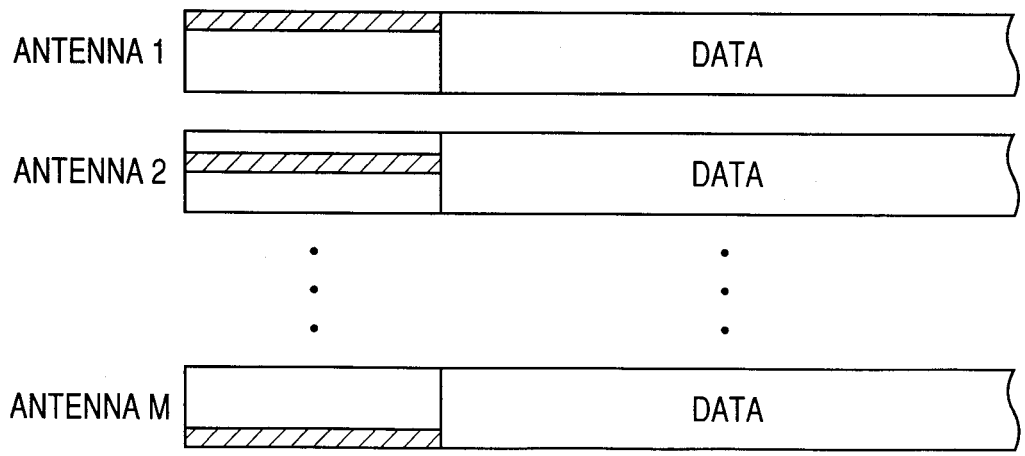

FIG. 3 is a drawing to show specific examples of the method of transmitting the training signal separately for each antenna. FIG. 3 (a) shows a time division multiplexing (TDM) system for switching the training signal transmission antennas in sequence in time series, thereby transmitting independent training signals from the antennas 201-1 to 201-M of the base station apparatus 200. FIG. 3 (*b*) shows a code division multiplexing (CDM) system for spreading training signal according to a code series predetermined for each antenna and transmitting the training signal at the same time from all antennas.

In the wireless communication apparatus 100, the training signals transmitted from the base station apparatus 200 are received at the antennas 101-1 to 101-N and are transferred by the transmission-reception switch means 102-1 to 102-N to the reception circuits 104-1 to 104-N and are subjected to reception processing. The channel estimation means 105 performs correlation processing of each training signal with the signal series or the like using the output signal from each of the reception circuits 104-1 to 104-N, thereby detecting the channel estimation value representing the situation of the propagation path of the down link. The channel estimation value is, for example, a complex number made up of amplitude and phase information. Such processing is performed for each of the training signals assigned to the antennas 201-1 to 201-M of the base station apparatus 200. The detected channel estimation value contains channel response received as the signal transmitted from the antenna of the base station apparatus 200 propagates until it is received at the antenna of the wireless communication apparatus 100 and deviation received while the signal is transferred through each of the reception circuits 104-1 to 104-N of the wireless communication apparatus 100.

Letting a channel matrix having the channel response received when the signal is propagated between the antennas as each element be H and deviation received while the signal is transferred through each of the reception circuits 104-1 to 104-N of the wireless communication apparatus 100 be $Z_{RX}$, channel estimation value $H_{DL}$ of the down link detected by the channel estimation means 105 of the wireless communication apparatus 100 becomes as in the following expression:

[Expression 3]

$$H_{DL} = Z_{Rx} \cdot H \quad (3)$$

$$= \begin{bmatrix} z_{Rx,1} & & 0 \\ & \ddots & \\ 0 & & z_{Rx,n} \end{bmatrix} \begin{bmatrix} h_{1,1} & h_{1,2} & \cdots & h_{1,M} \\ \vdots & & h_{i,j} & \vdots \\ h_{N,1} & h_{N,2} & \cdots & h_{N,M} \end{bmatrix}$$

$$= \begin{bmatrix} z_{Rx,1} \cdot h_{1,1} & z_{Rx,1} \cdot h_{1,2} & \cdots & z_{Rx,1} \cdot h_{1,M} \\ \vdots & & z_{Rx,i} \cdot h_{i,j} & \vdots \\ z_{Rx,N} \cdot h_{N,1} & z_{Rx,N} \cdot h_{N,2} & \cdots & z_{Rx,N} \cdot h_{N,M} \end{bmatrix}$$

As for the up link, channel estimation is also executed in a similar manner. A training signal already known in the base station apparatus 200 is transmitted from the wireless communication apparatus 100, and the channel estimation value is detected in the base station apparatus 200. The detected channel estimation value contains deviation received while the signal is transferred through each of the transmission circuits 103-1 to 103-N of the wireless communication apparatus 100 and channel response received as the signal transmitted from the antenna of the wireless communication apparatus 100 propagates until it is received at the antenna of the base station apparatus 200.

Letting deviation received while the signal is transferred through each of the transmission circuits 103-1 to 103-N of the wireless communication apparatus 100 be $Z_{TX}$, channel estimation value $H_{UL}$ of the up link detected by the channel estimation means 205 of the base station apparatus 200 becomes as in the following expression:

[Expression 4]

$$H_{UL} = H^T \cdot Z_{Tx} \quad (4)$$

$$= \begin{bmatrix} h_{1,1} & \cdots & h_{N,1} \\ h_{1,2} & & h_{N,2} \\ \vdots & h_{i,j} & \vdots \\ h_{1,M} & \cdots & h_{N,M} \end{bmatrix} \begin{bmatrix} z_{Tx,1} & & 0 \\ & \ddots & \\ 0 & & z_{Tx,N} \end{bmatrix}$$

$$= \begin{bmatrix} z_{Tx,1} \cdot h_{1,1} & \cdots & z_{Tx,N} \cdot h_{N,1} \\ z_{Tx,1} \cdot h_{1,2} & & z_{Tx,N} \cdot h_{N,2} \\ \vdots & z_{Tx,j} \cdot h_{j,i} & \vdots \\ z_{Tx,1} \cdot h_{1,M} & \cdots & z_{Tx,N} \cdot h_{N,M} \end{bmatrix}$$

where T denotes transposition of matrix.

FIG. 4 shows a procedure of detecting a correction value for correcting deviation occurring between the transmission and reception circuits of the wireless communication apparatus 100 in the wireless communication apparatus 100 and the base station apparatus 200 configured as in FIGS. 1 and 2. Next, the correction value detection procedure will be discussed with FIG. 4.

In the wireless communication apparatus 100, the correction value detection procedure is started at step 401. At step 402, a training signal is transmitted from the wireless communication apparatus 100 according to a training signal transmission method as described above. At step 403, the transmitted training signal is received at the base station apparatus 200 and the channel estimation means 205 detects the channel estimation value $H_{UL}$ of the up link. At step 404, using the detected channel estimation value $H_{UL}$, the correction signal (probe signal) generation means 212 generates a probe signal Scal as a correction signal used to detect the correction value in the wireless communication apparatus 100 and transmits the probe signal from the antenna. Using channel response from the jth antenna of the wireless communication apparatus 100 to each antenna of the base station apparatus 200, the probe signal $Scal_j$ for the jth antenna of the wireless communication apparatus 100 is generated as in the following expression (5):

[Expression 5]

$$Scal_j = \begin{bmatrix} 1/(z_{Tx,j} \cdot h_{j,1}) \\ 1/(z_{Tx,j} \cdot h_{j,2}) \\ \vdots \\ 1/(z_{Tx,j} \cdot h_{j,M}) \end{bmatrix} \quad (5)$$

This probe signal $Scal_j$ is transmitted from each of the antennas 201-1 to 201-M of the base station apparatus 200 using time division multiplexing or code division multiplexing. The probe signal can be transmitted as the time series signal of the training signal from the jth antenna used for the channel estimation is multiplied by the probe signal $Scal_j$, for example. At step 405, the probe signal transmitted from the base station apparatus 200 is subjected to channel deviation while it is propagated between the antennas and is received at the jth antenna of the wireless communication apparatus 100. The reception signal is transferred through the jth reception circuit and is input to the channel estimation means 105. When the channel estimation means 105 detects amplitude and phase for the probe signal of the reception signal in a similar manner to that of executing channel estimation with the training signal, the result becomes as in expression (6) shown below. The result uses the following nature: Since the previous detection result of channel deviation in the reverse link is used for transmission, if the channel deviation is sufficiently gentle, the channel deviation component is canceled and deviation of the antenna 201 and the transmission circuit 203 can be detected.

[Expression 6]

$$S_{DL\_Rx,j} = \frac{\sum z_{Rx,j}}{z_{Tx,j}} \quad (6)$$

As another probe signal, expression (7) may be used in place of expression (5). Since calibration between antennas needs only to be able to correct deviation of the relative amplitude and phase relationship, if the result of multiplying by complex coefficient value A common to all $Scal_j$ is thus adopted as the probe signal, calibration can be executed in a similar manner. Using this nature, transmission power control of the probe signal can be accomplished in the transmission power range stipulated in the Radio Law, etc., and the probe signal with sufficient signal to noise power ratio is transmitted, so that the calibration accuracy can be enhanced.

[Expression 7]

$$Scal_j = \begin{bmatrix} A/(z_{Tx,j} \cdot h_{j,1}) \\ A/(z_{Tx,j} \cdot h_{j,2}) \\ \vdots \\ A/(z_{Tx,j} \cdot h_{j,M}) \end{bmatrix} \quad (7)$$

The correction value detection means 110 uses the result to detect the following correction value $C_j$:

[Expression 8]

$$C_j = \frac{1}{M} S_{DL\_Rx,j} \approx \frac{z_{Rx,j}}{z_{Tx,j}} \quad (8)$$

As another correction value, expression (9) may be used in place of expression (8). Since calibration between antennas needs only to be able to correct deviation of the relative amplitude and phase relationship, the relative value with specific $C_j$ (hereinafter, written as $C_0$) as the reference can be used as the correction value. Accordingly, the antenna selected as the reference antenna eliminates the need for multiplication processing. In addition, a proper coefficient may be set as $C_0$.

[Expression 9]

$$C_j = \frac{z_{Rx,j}}{z_{Tx,j}} \frac{1}{C_0} \quad (9)$$

At step 406, the correction value $C_j$ detected by the correction value detection means 110 is stored in the correction value memory 111.

The processing sequence from generation of the probe signal in the base station apparatus 200 to storage of the correction value in the wireless communication apparatus 100 is performed for each antenna of the wireless communication apparatus 100, so that the correction value can be detected and stored for every deviation occurring between the transmission and reception circuits of the wireless communication apparatus 100. As a method of performing separately for each antenna of the wireless communication apparatus 100, for example, a time or code division multiplexing method, etc., is available as with the training signal described above.

As described above, the correction value for correcting deviation occurring between the transmission and reception circuits of the wireless communication apparatus 100 is detected, whereby the channel estimation value obtained by reception can be used for transmission weight generation in the wireless communication apparatus 100 and the base station apparatus 200.

Next, a transmission and reception weight generation method will be discussed. As the transmission and reception weight generation method, for example, a method of decomposing the channel estimation value into singular values and adopting singular vectors of the result as transmission and reception weights is available. A method of adopting the characteristic vectors of channel estimation values as transmission and reception weights is also available as described in patent document 1 in Background Art.

First, the determination method of the transmission and reception weights in the base station apparatus 200 will be discussed. FIG. 5 shows a transmission and reception weight generation procedure in the base station apparatus 200 configured as in FIG. 2. At step 501, in the wireless communication apparatus 100, a training signal is generated by making a correction with the correction value $C_j$ in expression (8). That is, the time series signal of the training signal transmitted from the jth transmission channel already known used for usual channel estimation is multiplied by the complex correction value $C_j$ to generate a time series signal as a new training signal where j is any natural number of 1 to M.

At step 502, a data signal to be transmitted together with the training signal is weighted with transmission weight. Transmission weight determination method in the wireless communication apparatus 100 is described later. At step 503, the training signal generated at step 501 and the data signal generated at step 502 are formed as shown in FIG. 3 and the resultant signal is transmitted. At step 504, the signal transmitted from the wireless communication apparatus 100 is received at the base station apparatus 200. At step 505, using the transmitted training signal, the channel estimation means 205 of the base station apparatus 200 executes channel estimation of the up link. Letting the channel estimation value of the up link be $H_{UL\_CAL}$, it becomes as in expression (10) shown below. Accordingly, for the channel estimation value $H_{UL\_CAL}$ of the up link, circuit deviation $Z_{TX}$ in the transmission circuits 203-1 to 203-M is removed, so that calibration is accomplished.

[Expression 10]

$$H_{UL\_CAL} = H^T \cdot Z_{Tx} \cdot C \qquad (10)$$

$$= \begin{bmatrix} h_{1,1} & \cdots & h_{N,1} \\ h_{1,2} & & h_{N,2} \\ \vdots & h_{i,j} & \vdots \\ h_{1,M} & \cdots & h_{N,M} \end{bmatrix} \begin{bmatrix} z_{Tx,1} & & 0 \\ & \ddots & \\ 0 & & z_{Tx,N} \end{bmatrix} \begin{bmatrix} c_1 & & 0 \\ & \ddots & \\ 0 & & c_N \end{bmatrix}$$

$$= \begin{bmatrix} z_{Rx,1} \cdot h_{1,1} & \cdots & z_{Rx,N} \cdot h_{N,1} \\ z_{Rx,1} \cdot h_{1,2} & & z_{Rx,N} \cdot h_{N,2} \\ \vdots & z_{Rx,j} \cdot h_{j,i} & \vdots \\ z_{Rx,1} \cdot h_{1,M} & \cdots & z_{Rx,N} \cdot h_{N,M} \end{bmatrix}$$

At step 506, reception weight is generated using the channel estimation value in expression (10). The reception weight generation means 207 of the base station apparatus 200 can use the channel estimation value $H_{UL\_CAL}$ of the up link to perform the following calculation:

[Expression 11]

$$H_{UL\_CAL} = U_{UL\_CAL} \cdot D_{UL\_CAL} \cdot V_{UL\_CAL}^H \qquad (11)$$

where $U_{UL\_CAL}$ is a left singular vector, $V_{UL\_CAL}$ is a right singular vector, and $D_{UL\_CAL}$ is a diagonal matrix having singular values as elements. The reception weight generation means 207 adopts the left singular vector $U_{UL\_CAL}$ as the reception weight.

At step 507, transmission weight is generated. The transmission weight generation means 208 generates transmission weight using the reception weight generated by the reception weight generation means 207. Accordingly, the transmission and reception weights in the base station apparatus 200 are determined.

At step 508, the generated transmission weight is used as weight in directional transmission for the data signal transmitted using the down link.

At step 509, the data signal generated at step 503 is weighted with the reception weight generated at step 506 to form reception data.

Figure 6:
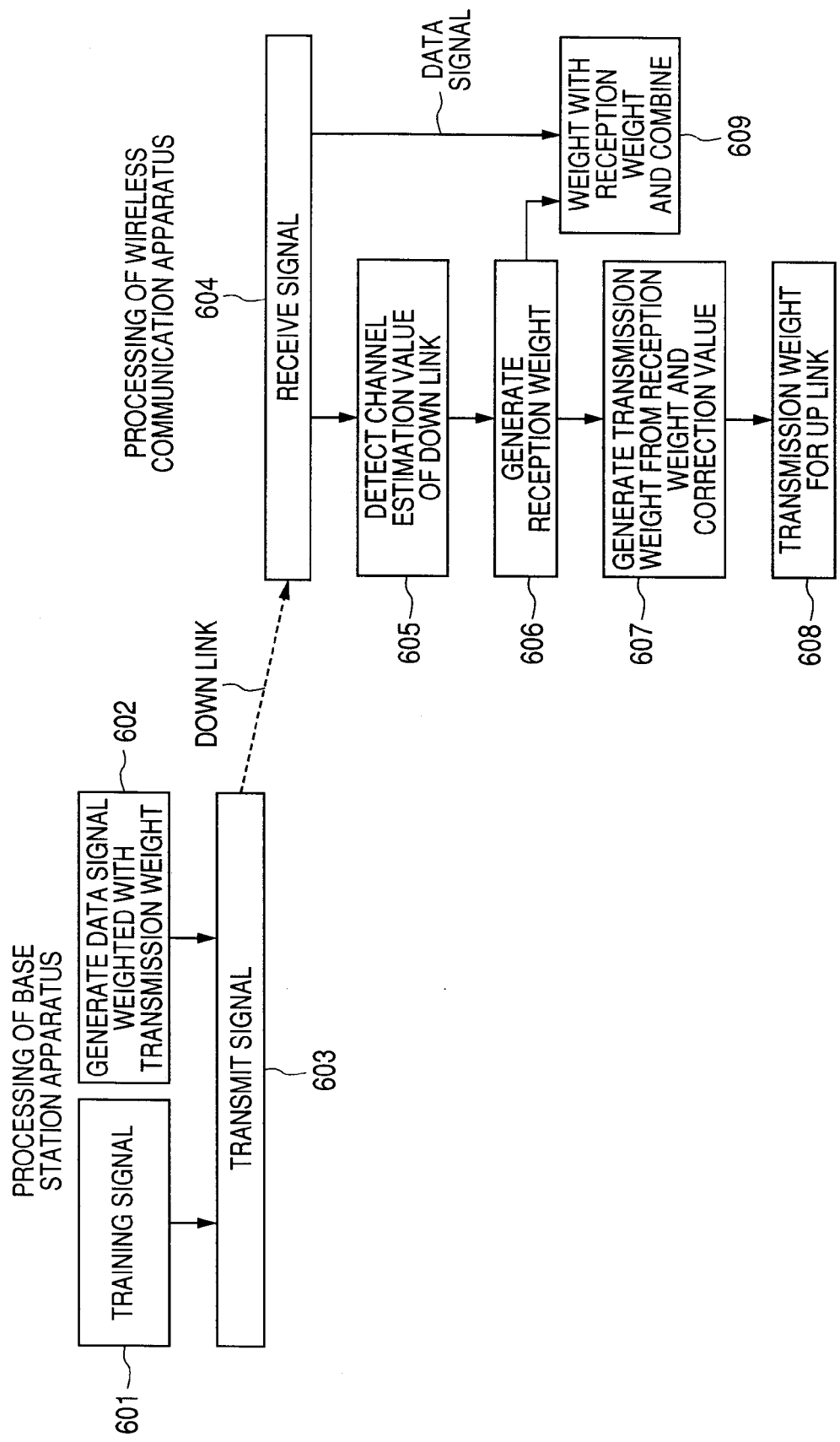
FIG. 6 A chart to show a transmission and reception weight generation procedure in the wireless communication apparatus of the first embodiment.

Next, the determination method of the transmission and reception weights in the wireless communication apparatus 100 will be discussed. FIG. 6 shows a transmission and reception weight generation procedure in the wireless communication apparatus 100 configured as in FIG. 1. At step 601, in the base station apparatus 200, a training signal is generated. At step 602, a data signal to be transmitted together with the training signal is weighted with transmission weight. The transmission weight in the base station apparatus 200 is determined according to the procedure described above. At step 603, the training signal generated at step 601 and the data signal generated at step 602 are formed as shown in FIG. 3 and the resultant signal is transmitted. At step 604, the signal transmitted from the base station apparatus 200 is received at the wireless communication apparatus 100. At step 605, using the transmitted training signal, the channel estimation means 105 of the wireless communication apparatus 100 executes channel estimation of the down link. At step 606, the reception weight generation means 107 of the wireless communication apparatus 100 can use the channel estimation value $H_{DL}$ of the down link to perform the following calculation:

[Expression 12]

$$H_{DL} = U_{DL} \cdot D_{DL} \cdot V_{DL}^H \qquad (12)$$

where $U_{DL}$ is a left singular vector, $V_{DL}$ is a right singular vector, and $D_{DL}$ is a diagonal matrix having singular values as elements. The reception weight generation means 107 adopts the right singular vector $V_{DL}$ as the reception weight.

At step 607, the transmission weight generation means 108 generates transmission weight by making a correction to the reception weight with the correction value $C_j$ in expression (8). Accordingly, the transmission and reception weights in the wireless communication apparatus 100 are determined.

At step 608, the generated transmission weight is used as weight in directional transmission for the data signal transmitted using the up link.

At step 609, the data signal generated at step 603 is weighted with the reception weight generated at step 606 to form reception data.

Next, another method for detecting a correction value for correcting deviation occurring between the transmission and reception circuits of the wireless communication apparatus 100 in the wireless communication apparatus 100 and the base station apparatus 200 configured as in FIGS. 1 and 2 is shown. It is the same as the procedure shown in FIG. 4 and a description is also given with FIG. 4.

In the base station apparatus, the channel estimation value $H_{UL}$ of the up link detected by the channel estimation means 205 is detected at steps 401, 402, and 403 as in the procedure described above. At step 404, using the detected channel estimation value $H_{UL}$, the correction signal (probe signal) generation means 212 generates a probe signal Scal used to detect the correction value in the wireless communication apparatus 100. First, using the channel estimation value $H_{UL}$ of the up link, the following calculation can be executed:

[Expression 13]

$$H_{UL} = U_{UL} \cdot D_{UL} \cdot V_{UL}^H \qquad (13)$$

where $U_{UL}$ is a left singular vector, $V_{UL}$ is a right singular vector, and $D_{UL}$ is a diagonal matrix having singular values as elements. Using the singular vectors $U_{UL}$ and $V_{UL}$ and the singular value $D_{UL}$, the probe signal Scal is generated as in the following expression (14):

[Expression 14]

$$\text{Scal} = U_{UL}^* \cdot (V_{UL}^* \cdot D_{UL}^T)^{-1} \qquad (11)$$

where * denotes a complex conjugate.

The probe signal Scal is transmitted from each antenna 201 of the base station apparatus 200. The probe signal Scal is made up of a matrix with M rows and N columns. Signal PLj (t, m) provided by copying time series signal of training signal PLj (t) from the jth antenna using the jth column vector dj for channel estimation as many as M channels is generated and value dj (m)·PLj (t, m) resulting from multiplying each signal by the mth element of dj is transmitted from the mth antenna where t represents the time and j=1 to N and m=1 to M.

The training signal PLj (t) is transmitted using time division multiplexing or code division multiplexing so that the wireless communication apparatus 100 can separate and receive the signal. After all probe signals are transmitted, at step 405, the transmitted probe signal is subjected to channel deviation while it is propagated between the antennas and is received at each antenna 101 of the wireless communication apparatus. The reception signal is transferred through each reception circuit 104 and is input to the channel estimation means 105. When the channel estimation means 105 detects amplitude and phase for the probe signal of the reception signal in a similar manner to that of executing channel estimation with the training signal, the result becomes as in expression (15) shown below. The result uses the following nature: Since the previous detection result of channel deviation in the reverse link is used for transmission, if the channel deviation is sufficiently gentle, the channel deviation component is canceled and deviation of the antenna 201 and the transmission circuit 203 can be detected.

[Expression 15]

$$S_{DL\_Rx} = Z_{Rx} \cdot (Z_{Tx})^{-1} \quad (15)$$

As another probe signal, expression (16) may be used in place of expression (14). Since calibration between antennas needs only to be able to correct deviation of the relative amplitude and phase relationship, if the result of multiplying by complex coefficient value A common to all $Scal_j$ is adopted as the probe signal, calibration can be executed in a similar manner. Using this nature, transmission power control of the probe signal can be accomplished in the transmission power range stipulated in the Radio Law, etc., and the probe signal with sufficient signal to noise power ratio is transmitted, so that the calibration accuracy can be enhanced.

[Expression 16]

$$Scal = A \cdot U_{UL}^* \cdot (V_{UL}^* \cdot D_{UL}^T)^{-1} \quad (16)$$

The correction value detection means 110 uses the result to detect the correction value C made up of a diagonal matrix with N rows and N columns shown in the following expression (17):

[Expression 17]

$$C = Z_{Rx} \cdot (Z_{Tx})^{-1} \quad (17)$$

As another correction value, expression (18) may be used in place of expression (17). Since calibration between antennas needs only to be able to correct deviation of the relative amplitude and phase relationship, the relative value with specific jth diagonal element $C_j$ (hereinafter, written as $C_0$) of the correction value C as the reference can be used as the correction value. Accordingly, the antenna selected as the reference antenna eliminates the need for multiplication processing. In addition, a proper coefficient may be set as $C_0$.

[Expression 18]

$$C = (1/c_0) Z_{Rx} \cdot (Z_{Tx})^{-1} \quad (18)$$

At step 406, the correction value C detected by the correction value detection means 110 is stored in the correction value memory 111.

Secondly, the determination method of the transmission and reception weights in the base station apparatus 200 will be discussed. The reception weight generation means 207 of the base station apparatus 200 decomposes the channel estimation value of the up link as represented in expression (13) into singular values and adopts the left singular vector $U_{UL}$ as the reception weight. The transmission weight generation means 208 adopts the reception weight provided by the reception weight generation means 207 intact as transmission weight without change. Accordingly, the transmission and reception weights in the base station apparatus 200 are determined.

On the other hand, the wireless communication apparatus 100 uses the channel estimation value $H_{DL}$ of the down link in expression (3) and the correction value C in expression (17). The reception weight generation means 107 can calculate as follows:

[Expression 19]

$$C^- \cdot H_{DL} = U_{DL\_CAL} \cdot D_{DL\_CAL} \cdot V_{DL\_CAL}^H \quad (19)$$

where $U_{DL\_CAL}$ is a left singular vector, $V_{DL\_CAL}$ is a right singular vector, and $D_{DL\_CAL}$ is a diagonal matrix having singular values as elements. Using the right singular vector $V_{DL\_CAL}$ and the correction value C, reception weight $W_{RX}$ can be calculated as follows:

[Expression 20]

$$W_{Rx} = V_{DL\_CAL}^T \cdot C^- \quad (20)$$

The transmission weight generation means 108 uses the right singular vector $V_{DL\_CAL}$ intact as transmission weight without change, thereby determining the transmission weight.

As described above, assuming use of the calibration configuration capable of correcting amplitude, phase deviation occurring between the transmission and reception circuits according to the method described in patent document 2 described in Background Art or the like, the base station apparatus 200 uses the communication signal to detect and correct deviation occurring between the transmission and reception circuits of the wireless communication apparatus 100 not having such a calibration configuration, whereby the need for adding hardware of a reference signal generation circuit, a switch circuit, etc., for calibration is eliminated and the wireless communication apparatus 100 can be miniaturized and can be put into low power consumption.

In the embodiment, because of the correction value detection technique, detection is executed at least once at the communication start time, etc., whereby if the propagation path situation changes, the correction value can be used and the correction value update frequency can be kept low.

On the other hand, to use a technique of feeding back channel estimation information or transmission weight information, if the propagation path situation changes, the information needs to be again sent; the technique of the embodiment is also effective from the viewpoint of enhancing the transfer efficiency.

The correction value detection may be executed at the communication start time, may be executed on a regular basis during communicating or when communications stop, or may be executed as requested by the owner of the wireless communication apparatus 100. It may be executed when a detector, etc., in the wireless communication apparatus 100 determines that correction is required. For example, to change transmission power, the possibility that the amplitude phase characteristic of the transmission circuit may change is high and this may be used as a trigger for detecting the correction value. If temperature change in the wireless communication apparatus exceeds a predetermined value, there is a possibility that the amplitude phase characteristic may change due to the temperature characteristic of the transmission circuit or the reception circuit and this may be used as a trigger for detecting the correction value. At conversation time and at non-conversation time, the antenna is affected by the nearby body such as a human body and the antenna directional characteristic may deviate and such a case may be used as a trigger for detecting the correction value.

Second Embodiment

Figure 7:
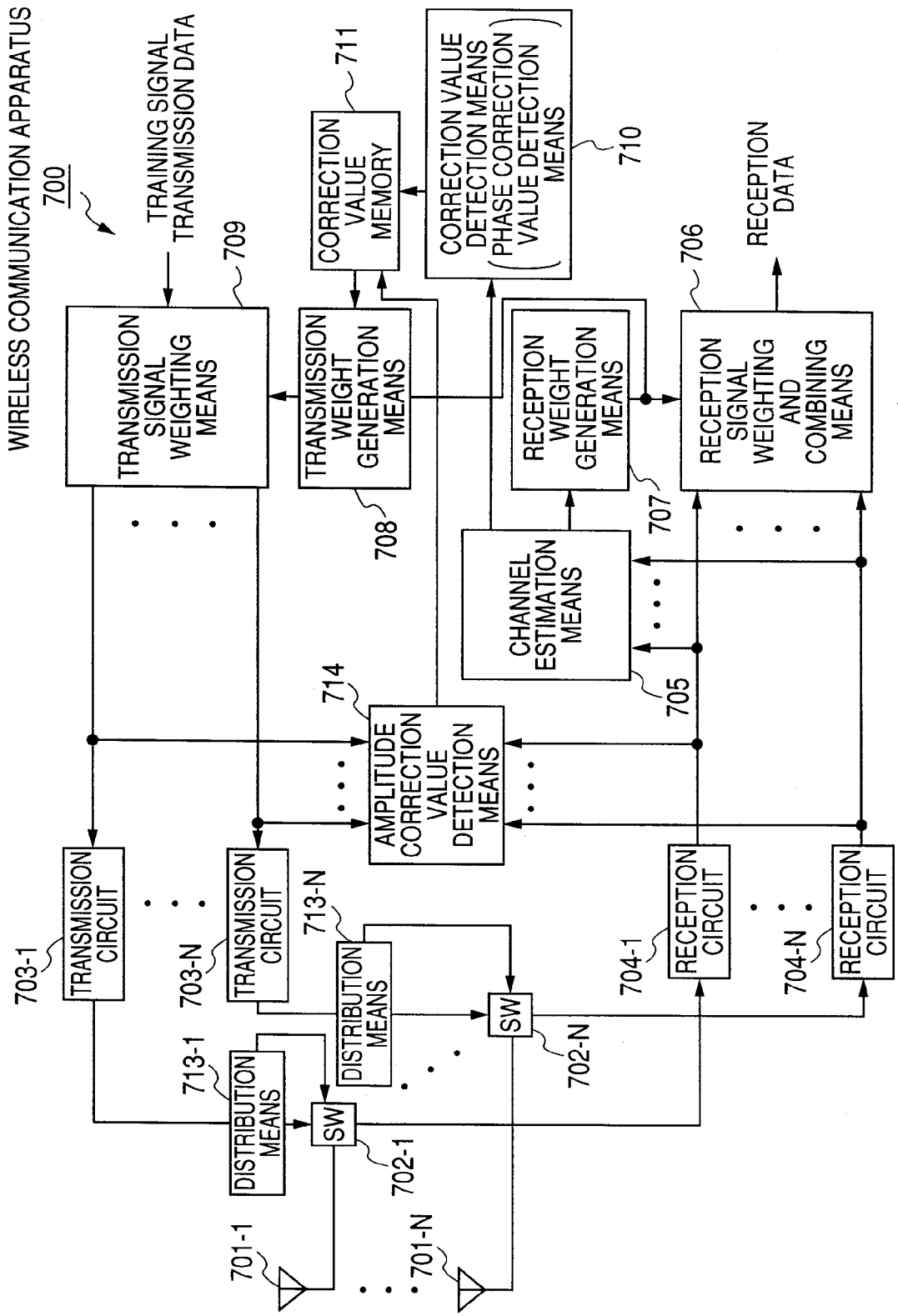
FIG. 7 A block diagram of a wireless communication apparatus according to a second embodiment of the invention.
Figure 8:
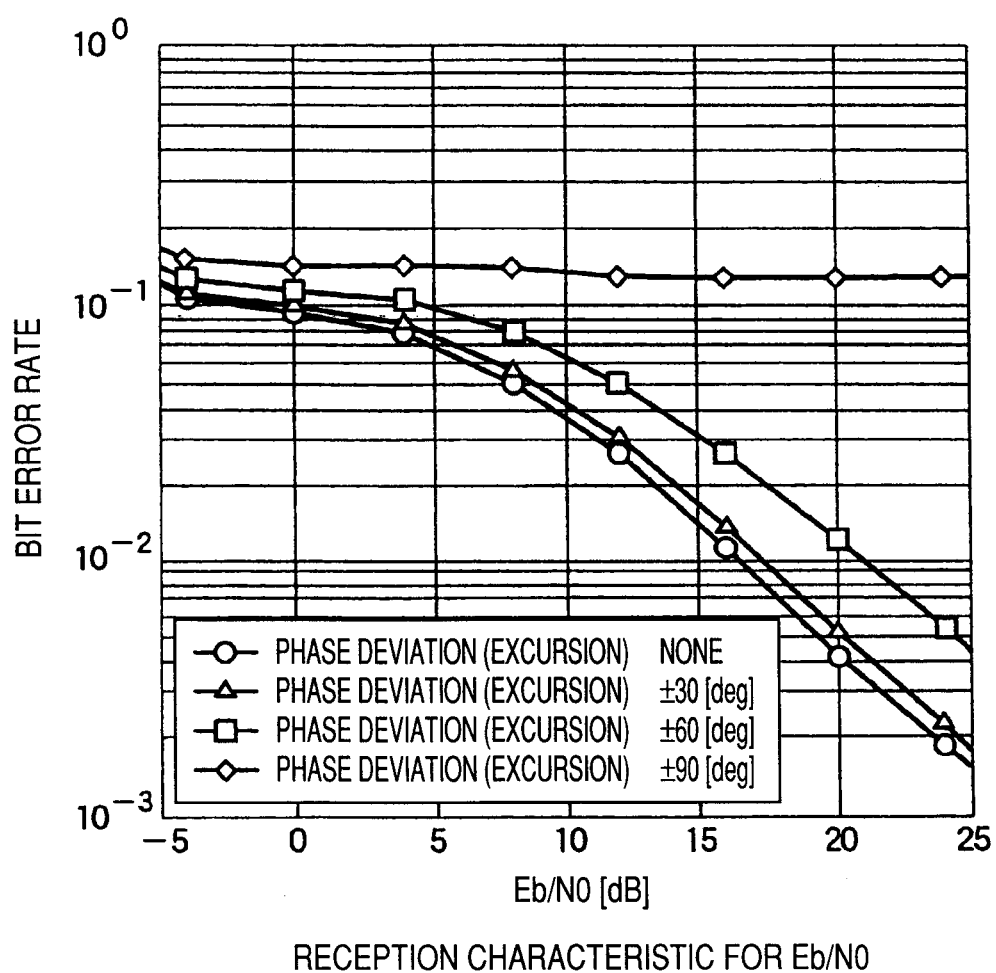
FIG. 8 A graph to show an example of the computer simulation result of the reception characteristic when amplitude, phase deviation occurs between transmission and reception circuits of a wireless communication apparatus.

FIG. 7 is a block diagram of a wireless communication apparatus according to a second embodiment of the invention. A wireless communication apparatus 700 shown in FIG. 7 is made up of a plurality of (N) antennas 701-1 to 701-N, a plurality of (N) transmission-reception switch means (SW) 702-1 to 702-N, a plurality of (N) transmission circuits 703-1 to 703-N, a plurality of (N) reception circuits 704-1 to 704-N, channel estimation means 705, reception signal weighting and combining means 706, reception weight generation means 707, transmission weight generation means 708, transmission signal weighting means 709, correction value detection means (phase correction value detection means) 710, correction value memory 711, a plurality of (N) signal distribution means 713-1 to 713-N, and amplitude correction value detection means 714.

The wireless communication apparatus 700 is provided by adding the signal distribution means 713-1 to 713-N and the amplitude correction value detection means 714 to the wireless communication apparatus 100 according to the first embodiment shown in FIG. 1, and the basic operation of the wireless communication apparatus 700 is the same as the operation of the wireless communication apparatus 100 according to the first embodiment. The wireless communication apparatus 700 conducts communications with the base station apparatus 200 shown in FIG. 2. The basic operation of the base station apparatus 200 is the same as the operation of that of the first embodiment.

The differences of the operation of the wireless communication apparatus 700 from that of the first embodiment will be discussed below: In the transmission circuits 703-1 to 703-N, parts of transmission signals are input to the amplitude correction value detection means 714.

As a method of taking out parts of transmission signals, to take out analog transmission signals after subjected to D/A conversion, a first method is used to distribute and take out the partial signals through distributor; to take out digital transmission signals before subjected to D/A conversion, a second method is used to copy the digital signals and take out the signals.

To take out analog transmission signals after subjected to D/A conversion in the first method, in addition to taking out the signals before the transmission circuits, if deviation between channels of a circuit near to input forming the transmission circuit is sufficiently small, the signal from output of the circuit may be taken out.

In the reception circuits 704-1 to 704-N, parts of transfer signals are input to the amplitude correction value detection means 714.

As a method of taking out parts of reception signals, to take out analog reception signals before subjected to A/D conversion, a first method is used to distribute and take out the partial signals through distributor; to take out digital reception signals after subjected to A/D conversion, a second method is used to copy the digital signals and take out the signals.

To take out analog reception signals after subjected to A/D conversion in the first method, in addition to taking out the signals from after the reception circuits, if deviation between channels of a circuit near to output forming the reception circuit is sufficiently small, the signal from input of the circuit may be taken out.

Using the input signals, the amplitude correction value detection means 714 detects a correction value for correcting amplitude deviation occurring between the transmission and reception circuits of the wireless communication apparatus 700. Using the channel estimation result of the channel estimation means 705, the correction value detection means (phase correction value detection means) 710 detects a correction value for correcting phase deviation occurring between the transmission and reception circuits of the wireless communication apparatus 700.

Each of the signal distribution means 713-1 to 713-N distributes a signal of partial power from the transmission signal supplied from each of the transmission circuits 703-1 to 703-N. The partial power is power in the range not affecting the transmission power; for example, the distribution power is roughly in the range of −15 dB to −20 dB.

The transmission signals and the distributed signals are supplied to the transmission-reception switch means (SW) 702-1 to 702-N. The transmission-reception switch means (SW) 702-1 to 702-N perform switch operation so as to supply the transmission signals to the antennas 701-1 to 701-N at the transmission timing and supply the reception signals from the antennas 701-1 to 701-N to the reception circuits 704-1 to 704-N at the reception timing as in the operation in the first embodiment. In addition, the transmission-reception switch means (SW) 702-1 to 702-N perform switch operation so as to supply parts of the transmission signals distributed by the signal distribution means 713-1 to 713-N to the reception circuits 704-1 to 704-N at the transmission timing and so as not to supply parts of the transmission signals distributed by the signal distribution means 713-1 to 713-N at the reception timing.

Procedures of detecting a correction value for correcting deviation occurring between the transmission and reception of the wireless communication apparatus 700 in the wireless communication apparatus 700 and the base station apparatus 200 configured as described above will be discussed. In the second embodiment, amplitude deviation and phase deviation correcting deviation occurring between the transmission and reception of the wireless communication apparatus are detected according to difference procedures.

First, the amplitude deviation detection procedure will be discussed. At the transmission timing in the wireless communication apparatus, transmission signals are transferred through the transmission circuits 703-1 to 703-N of the wireless communication apparatus 700 and transmission signals distributed by the signal distribution means 713-1 to 713-N are transferred through the reception circuits 704-1 to 704-N. At the transmission timing, the amplitude correction valve detection means 714 inputs the transmission signals transferred through the transmission circuits 703-1 to 703-N and the signals transferred through the reception circuits 704-1 to 704-N and compares the signals relative to amplitude or power, thereby detecting amplitude deviation received while the signals are transferred through the transmission circuits 703-1 to 703-N and the reception circuits 704-1 to 704-N. The correction value for correcting the detected amplitude deviation is calculated and is stored in the correction value memory 711.

At this time, the signals taken out from the transmission circuits 703-1 to 703-N may be digital signals input to the transmission circuits or may be analog signals after subjected to digital/analog conversion. Likewise, the signals taken out from the reception circuits 704-1 to 704-N may be digital signals output from the reception circuits or may be analog signals before subjected to analog/digital conversion.

Next, the phase deviation detection procedure will be discussed. Channel estimation using a training signal is executed as in the first embodiment. Accordingly, in the wireless communication apparatus 700, the channel estimation means 705 detects the channel estimation value of the down link represented in expression (3) and in the base station apparatus 200, the channel estimation means 205 detects the channel estimation value of the up link represented in expression (4).

In the base station apparatus 200 in FIG. 2, using the channel estimation value $H_{UL}$ of the up link detected by the channel estimation means 205, the correction signal (probe signal) generation means 212 generates a probe signal Scal used to detect the correction value in the wireless communication apparatus 700.

Using channel response from the jth antenna of the wireless communication apparatus 700 to each antenna of the base station apparatus 200, the probe signal $Scal_j$ for the jth antenna of the wireless communication apparatus is generated as in the following expression (21):

[Expression 21]

$$Scal_j = \begin{bmatrix} (z_{Tx,j} \cdot h_{j,1})^* \\ (z_{Tx,j} \cdot h_{j,2})^* \\ \vdots \\ (z_{Tx,j} \cdot h_{j,M})^* \end{bmatrix} \quad (21)$$

The probe signal $Scal_j$ is transmitted from each of the antennas 201-1 to 201-M of the base station apparatus. The transmitted probe signal is subjected to channel deviation while it is propagated between the antennas and is received at the jth antenna of the wireless communication apparatus 700. The reception signal is transferred through the jth reception circuit 704-j and is input to the channel estimation means 705. When the channel estimation means 705 detects amplitude and phase for the probe signal of the reception signal in a similar manner to that of executing channel estimation with the training signal, the result becomes as in the following expression (22).

[Expression 22]

$$S_{DL\_Rx,j} = (z_{Tx,j}^* \cdot z_{Rx,j}) \cdot \sum_{i=1}^{M} h_{j,i} \quad (22)$$

The correction value detection means (phase correction value detection means) 710 uses the result to detect phase correction value $C_{phase,j}$ shown in the following expression (23):

[Expression 23]

$$C_{Phase,j} = \frac{S_{DL\_Rx,j}}{|S_{DL\_Rx,j}|} \quad (23)$$

The correction value $C_{phase,j}$ detected by the correction value detection means (phase correction value detection means) 710 is stored in the correction value memory 711.

The processing sequence from generation of the probe signal in the base station apparatus to storage of the correction value in the wireless communication apparatus is performed for each antenna of the wireless communication apparatus, so that the correction value can be detected and stored for every deviation occurring between the transmission and reception circuits of the wireless communication apparatus. As a method of performing separately for each antenna of the wireless communication apparatus, for example, a time or code division multiplexing method, etc., is available as with the training signal described above.

As described above, the correction value for correcting deviation occurring between the transmission and reception circuits of the wireless communication apparatus 700 can be detected separately for amplitude deviation and phase deviation. The amplitude deviation can be detected according to the simple configuration for only comparing amplitude values or power values in the wireless communication apparatus. For the transmission and reception weight generation method and the weight correction method using the correction value, the methods described in the first embodiment can be used.

As described above, according to the embodiment, the communication signal can be used to detect and correct amplitude deviation and phase deviation occurring between the transmission and reception circuits. Accordingly, the transfer link characteristics of the transmission circuits and the reception circuits can be corrected according to the simple configuration without generating a correction signal (reference signal) in the wireless communication apparatus and without the need for adding a switch circuit for switching input and output of transmission and reception circuits at the calibration time, so that the configuration of the wireless communication apparatus can be miniaturized. Therefore, correction of deviation occurring between transmission and reception circuits can be accomplished even with a small wireless communication apparatus for weighing signals in both transmission and reception and conducting communications using a plurality of antennas.

While the invention has been described in detail with reference to the specific embodiments, it will be obvious to those skilled in the art that various changes and modifications can be made without departing from the spirit and the scope of the invention.

This application is based on Japanese Patent Application (No. 2004-231930) filed on Aug. 9, 2004 and Japanese Patent Application (No. 2005-215321) filed on Jul. 26, 2005, which are incorporated herein by reference.

INDUSTRIAL APPLICABILITY

The invention has the advantage that it is made possible to correct the transfer link characteristics of the transmission circuits and the reception circuits according to the simple configuration even in a small wireless communication apparatus without generating a correction signal in the wireless communication apparatus, and is useful as a wireless communication apparatus, etc., for conducting wireless communications using a plurality of antennas.

The invention claimed is:

1. A signal generation device for a base station apparatus that includes a reception circuit and a first transmission circuit, for receiving a TDD (Time Division Duplex) signal transmitted from a counterpart wireless communication apparatus and received by the reception circuit through an antenna and supplying a transmission signal to the antenna through the first transmission circuit, the signal generation device comprising:

a channel estimation unit which estimates a channel estimation value based on a known signal contained in the received TDD signal, the channel estimation value including a channel response of the known signal generated in a transmission path between the signal generation device and the counterpart wireless communication apparatus and a fluctuation generated by a second transmission circuit of the counterpart wireless communication apparatus that has transmitted the known signal;

a correction signal generation unit which generates a correction signal including the fluctuation generated by the second transmission circuit of the counterpart wireless communication apparatus that has transmitted the known signal based on the channel estimation value; and a transmission signal weighting unit which outputs the transmission signal generated by weighting transmission data containing the correction signal using a transmission weight to the first transmission circuit.

2. The signal generation device according to claim 1, wherein
the correction signal generation unit generates the correction signal which includes a reciprocal of the channel estimation value.

3. The signal generation device according to claim 1, wherein
the correction signal generation unit generates the correction signal using a result of singular value decomposition which is performed on the channel estimation value.

4. A method of signal generation for a base station apparatus that includes a reception circuit and a first transmission circuit, for receiving a TDD (Time Division Duplex) signal transmitted from a counterpart wireless communication apparatus and received by the reception circuit through an antenna and supplying a transmission signal to the antenna through the first transmission circuit, the method comprising:
estimating a channel estimation value based on a known signal contained in the received TDD signal, the channel estimation value including a channel response of the known signal generated in a transmission path between the signal generation device and the counterpart wireless communication apparatus and a fluctuation generated by a second transmission circuit of the counterpart wireless communication apparatus that has transmitted the known signal;
generating a correction signal including the fluctuation generated by the second transmission circuit of the counterpart wireless communication apparatus that has transmitted the known signal based on the channel estimation value; and
outputting the transmission signal generated by weighting transmission data containing the correction signal using a transmission weight to the first transmission circuit.

5. The method according to claim 4, wherein
in a process of generating the correction signal, the correction signal is generated which includes a reciprocal of the channel estimation value.

6. The method according to claim 4, wherein
in a process of generating the correction signal, the correction signal is generated using a result of singular value decomposition which is performed on the channel estimation value.

* * * * *